United States Patent [19]
Wilson

[11] Patent Number: 5,607,112
[45] Date of Patent: Mar. 4, 1997

[54] HOME RECYCLING CENTER

[76] Inventor: Russell G. Wilson, 184 Roses Grove Rd., Water Mill, N.Y. 11976

[21] Appl. No.: 517,738

[22] Filed: Aug. 21, 1995

[51] Int. Cl.⁶ .......................... B02C 19/14; B02C 23/10
[52] U.S. Cl. .............................. 241/33; 241/99; 241/100; 241/DIG. 38
[58] Field of Search ...................... 241/99, 100, DIG. 38, 241/79, 33

[56] References Cited

U.S. PATENT DOCUMENTS

| | | | |
|---|---|---|---|
| 2,800,159 | 7/1957 | Walsh et al. | 241/99 X |
| 4,098,181 | 7/1978 | Schultz | 100/102 |
| 4,102,263 | 7/1978 | Forsberg | 100/74 |
| 4,373,435 | 2/1983 | Grevich | 100/49 |
| 4,573,641 | 3/1986 | De Woolfson et al. | 241/36 |
| 5,139,205 | 8/1992 | Gallagher et al. | 241/33 |
| 5,165,610 | 11/1992 | Pendleton | 241/79 |
| 5,213,272 | 5/1993 | Gallagher et al. | 241/33 |
| 5,248,102 | 9/1993 | Bohn | 241/99 |
| 5,423,492 | 6/1995 | Willis | 241/81 |

Primary Examiner—John M. Husar

[57] ABSTRACT

A home recycling center comprised of a hollow rectangular compartment having an opening formed through a top wall thereof. A vertical compartment is secured to the top wall about the opening formed therethrough. The rectangular compartment has a plurality of longitudinal tracks secured therein. Each of the tracks is secured to a front wall with a corresponding track secured to a rear wall. A crushing mechanism is secured within the vertical compartment of the hollow rectangular compartment. A plurality of storage containers have wheels adapted for slidable coupling with the plurality of longitudinal tracks of the hollow rectangular compartment.

9 Claims, 5 Drawing Sheets

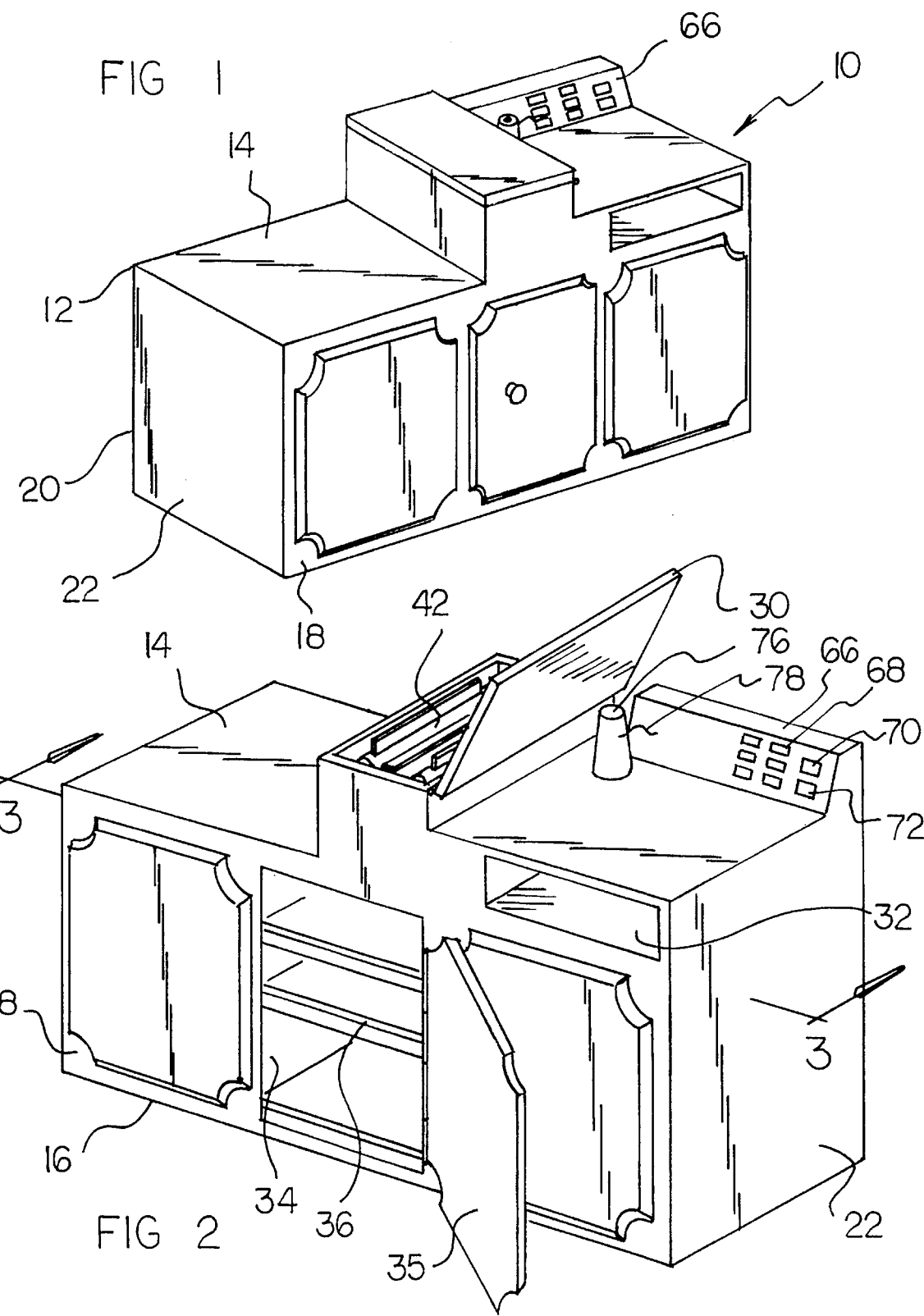

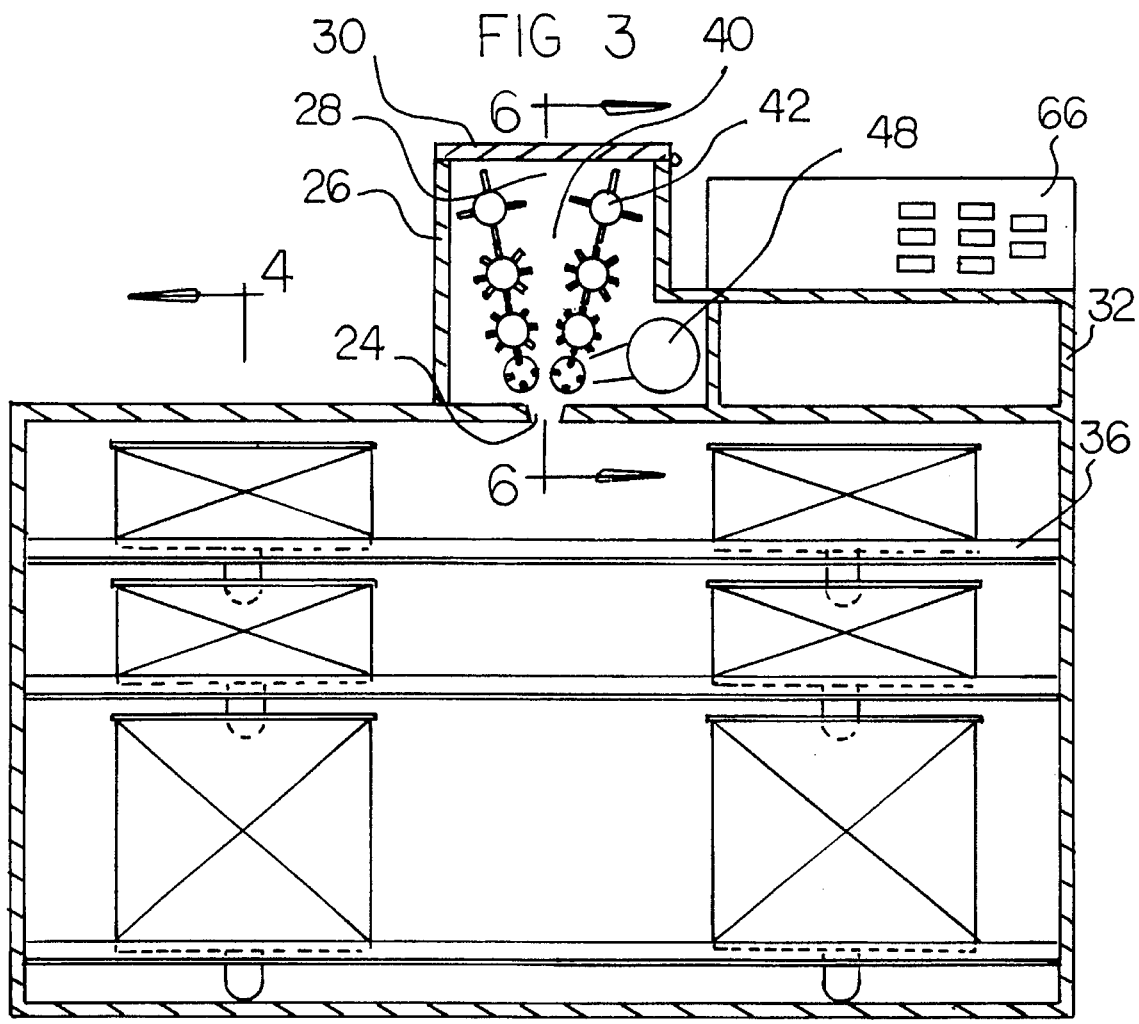
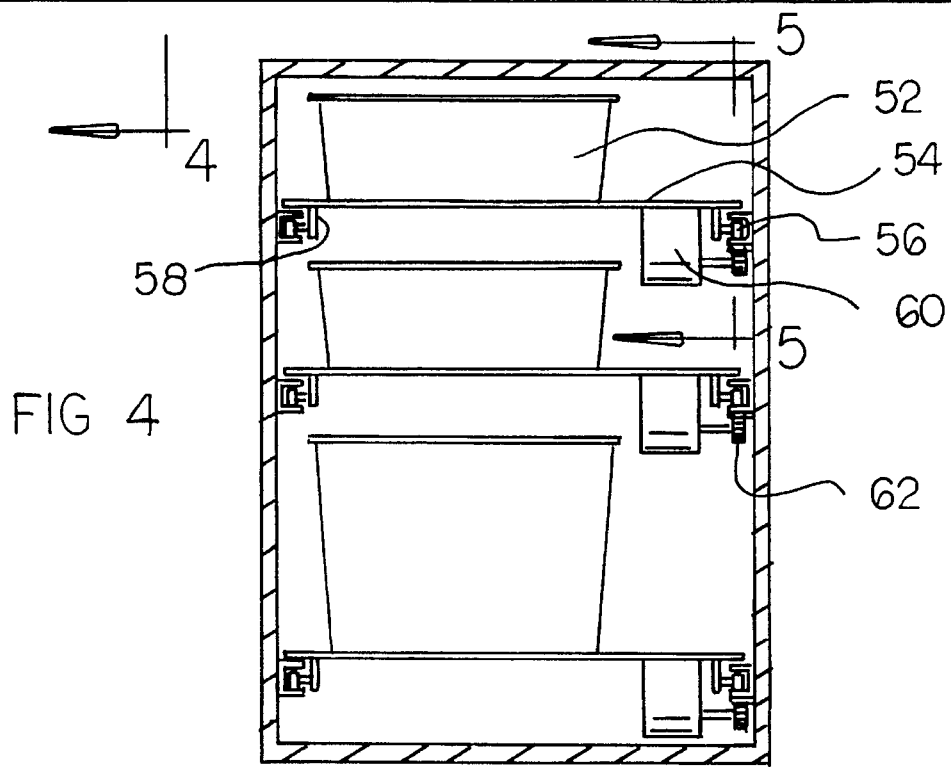

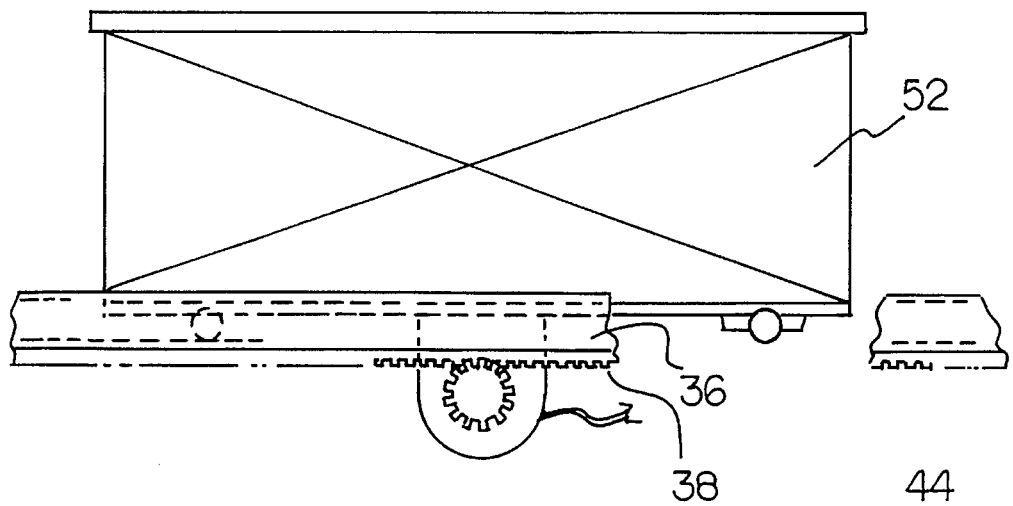
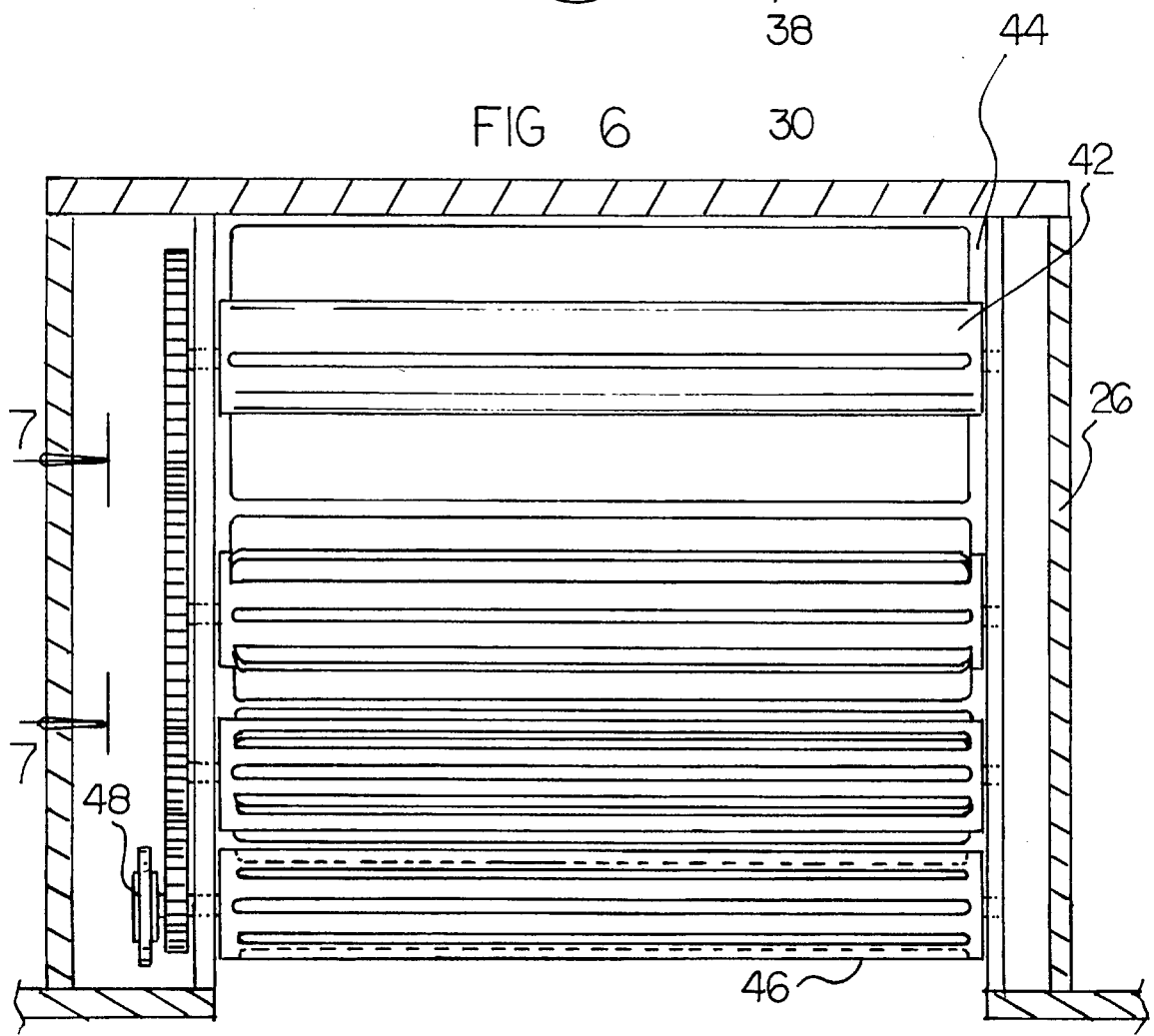

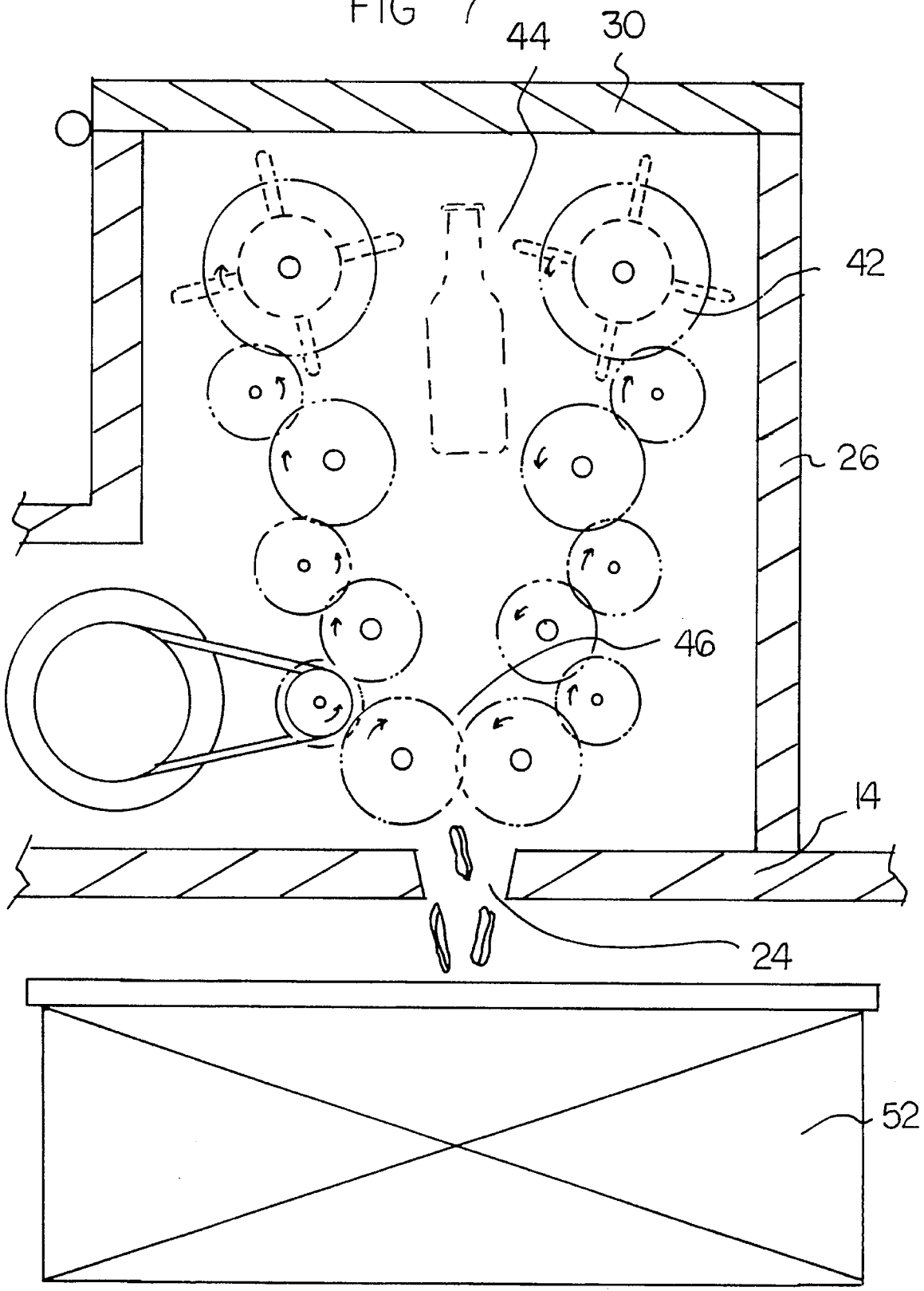

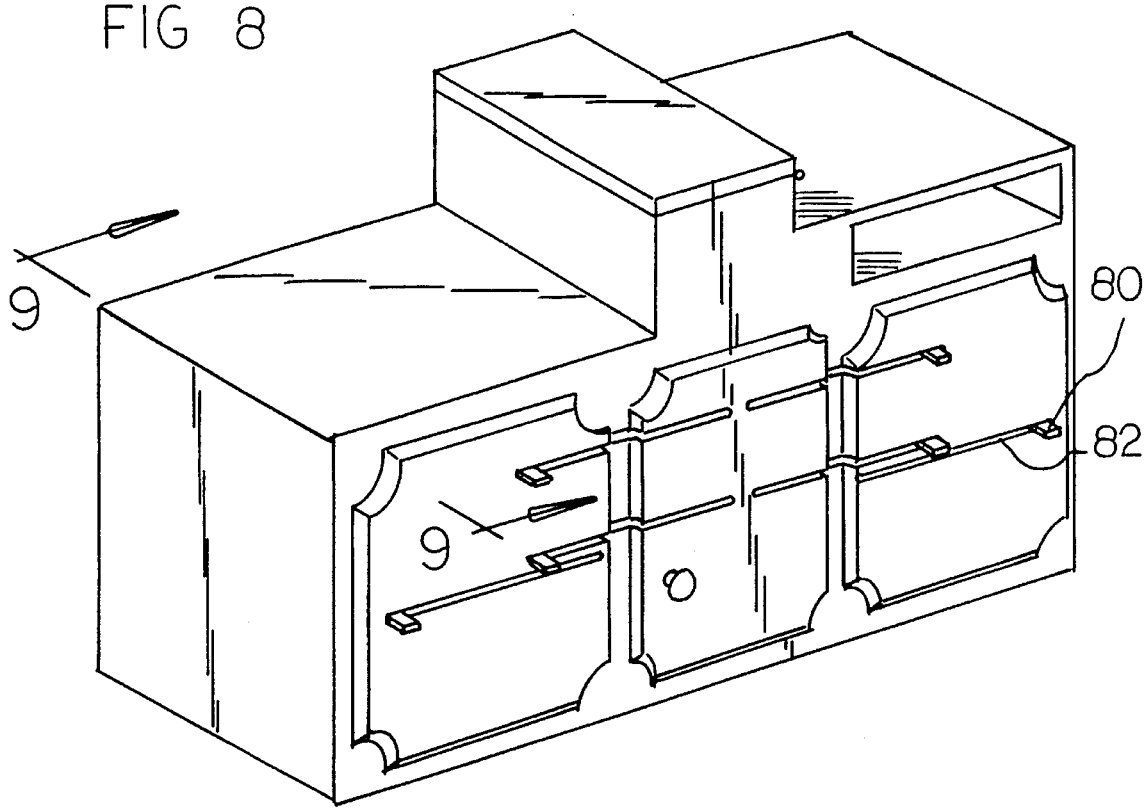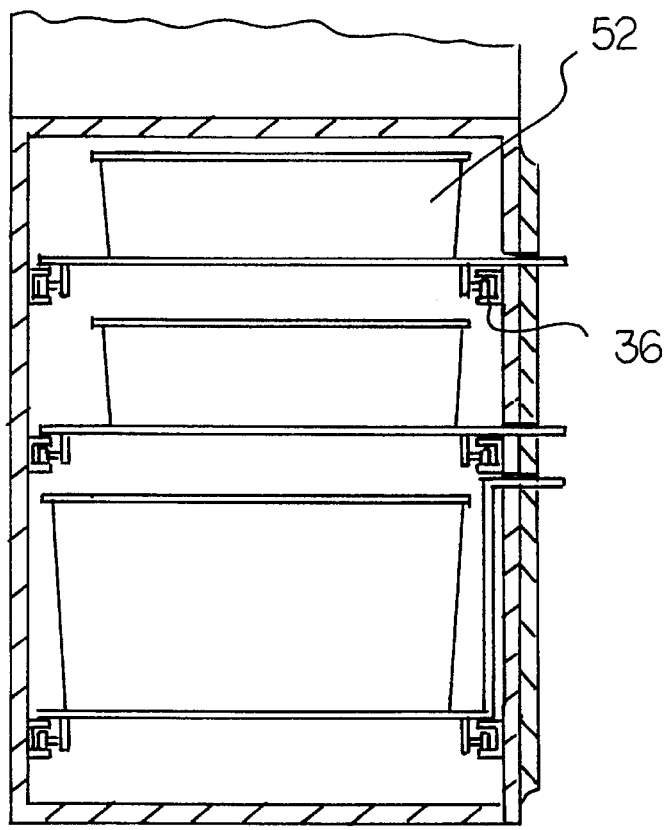

HOME RECYCLING CENTER

BACKGROUND OF THE INVENTION

1. Field of the Invention

The present invention relates to a home recycling center and more particularly pertains to crushing glass, flattening metals and plastic to be automatically deposited into storage containers with a home recycling center.

2. Description of the Prior Art

The use of recycling units is known in the prior art. More specifically, recycling units heretofore devised and utilized for the purpose of separating bottles and trash for recycling are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,228,577 to Wilson discloses an apparatus for separating household trash.

U.S. Pat. No. 5,213,402 to Bernal et al. discloses a recycling cabinet unit.

U.S. Pat. No. 5,148,932 to Orefice discloses a materials-recycling collection bin assembly.

U.S. Pat. No. 5,119,958 to Gabert et al. discloses a sort and cycle bin.

U.S. Pat. No. Des. 349,380 to Maturino discloses the ornamental design for a home recycling center bin.

U.S. Pat. No. Des. 341,687 to Park discloses the ornamental design for a recycling bin utilizing plastic bags.

While these devices fulfill their respective, particular objective and requirements, the aforementioned patents do not describe a home recycling center for crushing glass, flattening metals and plastic to be automatically deposited into storage containers.

In this respect, the home recycling center according to the present invention substantially departs from the conventional concepts and designs of the prior art, and in doing so provides an apparatus primarily developed for the purpose of crushing glass, flattening metals and plastic to be automatically deposited into storage containers.

Therefore, it can be appreciated that there exists a continuing need for new and improved home recycling center which can be used for crushing glass, flattening metals and plastic to be automatically deposited into storage containers. In this regard, the present invention substantially fulfills this need.

SUMMARY OF THE INVENTION

In the view of the foregoing disadvantages inherent in the known types of recycling units now present in the prior art, the present invention provides an improved home recycling center. As such, the general purpose of the present invention, which will be described subsequently in greater detail, is to provide a new and improved home recycling center and method which has all the advantages of the prior art and none of the disadvantages.

To attain this, the present invention essentially comprises a hollow rectangular compartment having a top wall, a bottom wall, a front wall, a rear wall, and two side walls. The top wall has an opening formed therethrough in a central portion thereof. A vertical compartment is secured to the top wall about the opening formed therethrough. The vertical compartment has an open top with a lid hingedly secured thereto. A horizontal compartment is secured to the top wall adjacent to the vertical compartment. The front wall has an opening formed therethrough with an access door hingedly secured thereto. The compartment has a plurality of longitudinal tracks secured therein. Each of the tracks is secured to the front wall with a corresponding track secured to the rear wall. The tracks that are secured to the front wall have a plurality of teeth formed on a lower edge thereof. A crushing mechanism is secured within the vertical compartment of the hollow rectangular compartment. The crushing mechanism comprises a plurality of rotating gears arranged in a vertical fashion. The plurality of gears has a wide upper end adjacent to the open top of the vertical compartment and tapering downwardly towards a narrow lower end immediately above the opening formed through the top wall of the hollow rectangular compartment. The crushing mechanism further comprises a drive pulley coupled with the plurality of rotating gears whereby activation of the drive pulley will rotate the plurality of gears. The device contains a plurality of storage containers. Each of the storage containers has a shelf secured to a lower portion thereof. Each of the shelves has wheels secured to downwardly extending brackets on opposing sides thereof. The wheels are adapted for slidable coupling with the plurality of longitudinal tracks of the hollow rectangular compartment. Each of the shelves has a motor secured to an underside thereof. Each motor has a drive gear extending outwardly therefrom to engage the plurality of teeth on the lower edge of the plurality of longitudinal tracks on the front wall of the hollow rectangular compartment whereby activation of each motor will slide the plurality of storage containers back and forth along the plurality of longitudinal tracks. A control mechanism is secured to an upper portion of the horizontal compartment of the hollow rectangular compartment. The control mechanism has means to control the activation and deactivation of the crushing mechanism and the slidability of the plurality of storage containers. A twine dispenser is secured to the upper portion of the horizontal compartment of the hollow rectangular compartment adjacent to the control mechanism. The twine dispenser has twine removably secured therein.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved home recycling center which has all the advantages of the prior art recycling units and none of the disadvantages.

It is another object of the present invention to provide a new and improved home recycling center which may be easily and efficiently manufactured and marketed.

It is a further object of the present invention to provide a new and improved home recycling center which is of durable and reliable construction.

An even further object of the present invention is to provide a new and improved home recycling center which is susceptible of a low cost of manufacture with regard to both materials and labor, and which accordingly is then susceptible of low prices of sale to the consuming public, thereby making such a home recycling center economically available to the buying public.

Still yet another object of the present invention is to provide a new and improved home recycling center which provides in the apparatuses and methods of the prior art some of the advantages thereof, while simultaneously overcoming some of the disadvantages normally associated therewith.

Even still another object of the present invention is to provide a new and improved home recycling center for crushing glass, flattening metals and plastic to be automatically deposited into storage containers.

Lastly, it is an object of the present invention to provide a new and improved home recycling center comprised of a hollow rectangular compartment having an opening formed through a top wall thereof. A vertical compartment is secured to the top wall about the opening formed therethrough. The rectangular compartment has a plurality of longitudinal tracks secured therein. Each of the tracks is secured to a front wall with a corresponding track secured to a rear wall. A crushing mechanism is secured within the vertical compartment of the hollow rectangular compartment. A plurality of storage containers have wheels adapted for slidable coupling with the plurality of longitudinal tracks of the hollow rectangular compartment.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the home recycling center constructed in accordance with the principles of the present invention.

FIG. 2 is a perspective view of the present invention illustrated with doors ajar.

FIG. 3 is a cross-sectional view as taken along line 3—3 of FIG. 2.

FIG. 4 is a cross-sectional view as taken along line 4—4 of FIG. 3.

FIG. 5 is a cross-sectional view as taken along line 5—5 of FIG. 4.

FIG. 6 is a cross-sectional view as taken along line 6—6 of FIG. 3.

FIG. 7 is a cross-sectional view as taken along line 7—7 of FIG. 6.

FIG. 8 is a perspective view of a second embodiment of the present invention.

FIG. 9 is a cross-sectional view as taken along line 9—9 of FIG. 8.

The same reference numerals refer to the same parts through the various Figures.

DESCRIPTION OF THE PREFERRED EMBODIMENT

With reference now to the drawings, and in particular, to FIG. 1 thereof, the preferred embodiment of the new and improved home recycling center embodying the principles and concepts of the present invention and generally designated by the reference number 10 will be described.

Specifically, it will be noted in the various Figures that the device relates to a new and improved home recycling center for crushing glass, flattening metals and plastic to be automatically deposited into storage containers. In its broadest context, the device consists of a hollow rectangular compartment, a crushing mechanism, a plurality of storage containers, a control mechanism, and a twine dispenser. Such components are individually configured and correlated with respect to each other so as to attain the desired objective.

The first component of the device 10 is a hollow rectangular compartment 12. The hollow rectangular compartment 12 has a top wall 14, a bottom wall 16, a front wall 18, a rear wall 20, and two side walls 22. The top wall 14 has an opening 24 formed therethrough in a central portion thereof. The opening 24 needs to be large enough to allow for the passage of broken glass, crushed aluminum cans, and crushed plastic containers therethrough. A vertical compartment 26 is secured to the top wall 14 about the opening formed therethrough. The vertical compartment 26 has an open top 28 with a lid 30 hingedly secured thereto. A horizontal compartment 32 is secured to the top wall 14 adjacent to the vertical compartment 26. The horizontal compartment 32 is utilized to hold miscellaneous items to be used in the recycling process such as loose paper, tools, and other odd items. The front wall 18 has an opening 34 formed therethrough with an access door 35 hingedly secured thereto. The opening 34 allows a user access inside of the hollow rectangular compartment 12. The hollow rectangular compartment 12 has a plurality of longitudinal tracks 36 secured therein. Each of the tracks 36 is secured to the front wall 18 with a corresponding track secured to the rear wall. The tracks 36 that are secured to the front wall have a plurality of teeth 38 formed on a lower edge thereof. The longitudinal tracks 36 are preferably arranged in three rows across the hollow rectangular container 12. The tracks 36 are also preferably arranged so that two equally narrow spaces and one wide space is left between the three tracks 36 and the top wall 14 and the bottom wall 16.

The second component of the device 10 is a crushing mechanism 40. The crushing mechanism 40 is secured within the vertical compartment 26 of the hollow rectangular compartment 12. The crushing mechanism 40 comprises a plurality of rotating gears 42 arranged in a vertical fashion. The plurality of gears 42 has a wide upper end 44 adjacent to the open top 28 of the vertical compartment 26 and tapering downwardly towards a narrow lower end 46 immediately above the opening 24 formed through the top wall 14 of the hollow rectangular compartment 12. The crushing mechanism 40 further comprises a drive pulley 48 coupled with the plurality of rotating gears 42 whereby activation of the drive pulley 48 will rotate the plurality of gears 42. Once the drive pulley 48 is activated, the plurality of rotating gears 42 will rotate. A glass bottle or an aluminum can is placed through the wide upper end 44 whereby the gears 42 will carry the bottle or can downwardly to the narrow lower end 46 at which time the bottle will break apart or the can will be crushed so that the remains will be transferred through the opening 24 in the top wall 14 of the hollow rectangular compartment 12.

The third component of the device is a plurality of storage containers 52. Each of the storage containers 52 has a shelf 54 secured to a lower portion thereof. Each of the shelves 54 has wheels 56 secured to downwardly extending brackets 58 on opposing sides thereof. The wheels 56 are adapted for slidable coupling with the plurality of longitudinal tracks 36 of the hollow rectangular compartment 12. Each of the shelves 54 has a motor 60 secured to an underside thereof. Each motor 60 has a drive gear 62 extending outwardly therefrom to engage the plurality of teeth 38 on the lower edge of the plurality of longitudinal tracks 36 on the front wall 18 of the hollow rectangular compartment 12 whereby activation of each motor 60 will slide the plurality of storage containers 52 back and forth along the plurality of longitudinal tracks 36. The preferred number of storage containers utilized is six, with three on opposing ends of the hollow rectangular container, two of which will be narrow and one of which will be wider. The storage containers 52 are used to catch the broken glass or crushed cans that are dispensed through the opening 24 in the top wall 14 of the hollow rectangular container 12. Each of the storage containers 52 is designated to receive a certain type of recyclable item whether it be clear glass, green glass, brown glass, tin, plastic, or aluminum.

The fourth component of the device 10 is a control mechanism 66. The control mechanism 66 is secured to an upper portion of the horizontal compartment 32 of the hollow rectangular compartment 12. The control mechanism 66 has means to control the activation and deactivation of the crushing mechanism 40 and the slidability of the plurality of storage containers 52. The control mechanism 66 further comprises six selection buttons 68 corresponding to the six storage containers 52 whereby pressing of one of the six buttons 68 will slide a corresponding storage container 52 beneath the opening 24 in the top wall 14 of the hollow rectangular container 12. The control mechanism 66 also has an activation button 70 and a deactivation button 72.

The final component of the device 10 is a twine dispenser 76. The twine dispenser 76 is secured to the upper portion of the horizontal compartment 32 of the hollow rectangular compartment 12 adjacent to the control mechanism 66. The twine dispenser 76 has twine 78 removably secured therein.

The twine is used to bind piles of newspapers for the ease of moving the newspapers to be recycled.

A second embodiment of the present invention is shown in FIG. 8 and includes substantially all of the components of the present invention wherein each of the plurality of storage containers 52 has a handle portion 80 extending outwardly of slots 82 formed in the front wall 18 of the hollow rectangular container 12 whereby grasping the handle portion 80 allows for the storage containers 52 to slide back and forth along the plurality of longitudinal tracks 36. The handle portions 80 replace the motors 60 on the storage containers 52 thereby allowing the storage containers 52 to be slid manually instead of automatically. The second embodiment also eliminates the control mechanism 66. Thus the device 10 would have only a power button situated at the back of the device 10 to activate the crushing mechanism 40. Depending on which type of material is being crushed, the user simply slides the corresponding storage container 52 underneath the crushing mechanism 40 to begin the recycling process.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A home recycling center for crushing glass, flattening metals and plastic to be automatically deposited into storage containers comprising, in combination:

a hollow rectangular compartment having a top wall, a bottom wall, a front wall, a rear wall, and two side walls, the top wall having an opening formed therethrough in a central portion thereof, a vertical compartment secured to the top wall about the opening formed therethrough, the vertical compartment having an open top with a lid hingedly secured thereto, a horizontal compartment secured to the top wall adjacent to the vertical compartment, the front wall having an opening formed therethrough with an access door hingedly secured thereto, the rectangular compartment having a plurality of longitudinal tracks secured therein, each of the tracks secured to the front wall with a corresponding track secured to the rear wall, the tracks secured to the front wall having a plurality of teeth formed on a lower edge thereof;

a crushing mechanism secured within the vertical compartment of the hollow rectangular compartment, the crushing mechanism comprising a plurality of rotating gears arranged in a vertical fashion, the plurality of gears having a wide upper end adjacent to the open top of the vertical compartment and tapering downwardly towards a narrow lower end immediately above the opening formed through the top wall of the hollow rectangular compartment, the crushing mechanism further comprising a drive pulley coupled with the plurality of rotating gears whereby activation of the drive pulley will rotate the plurality of gears;

a plurality of storage containers, each of the storage containers having a shelf secured to a lower portion thereof, each of the shelves having wheels secured to downwardly extending brackets on opposing sides thereof, the wheels adapted for slidable coupling with the plurality of longitudinal tracks of the hollow rectangular compartment, each of the shelves having a motor secured to an underside thereof, each motor having a drive gear extending outwardly therefrom to engage the plurality of teeth on the lower edge of the plurality of longitudinal tracks on the front wall of the hollow rectangular compartment whereby activation of each motor will slide the plurality of storage containers back and forth along the plurality of longitudinal tracks;

a control mechanism secured to an upper portion of the horizontal compartment of the hollow rectangular compartment, the control mechanism having means to control the activation and deactivation of the crushing mechanism and the slidability of the plurality of storage containers;

a twine dispenser secured to the upper portion of the horizontal compartment of the hollow rectangular compartment adjacent to the control mechanism, the twine dispenser having twine removably secured therein.

2. The center as described in claim 1 wherein the number of storage containers is six.

3. The center as described in claim 2 wherein the control mechanism further comprising six selection buttons corresponding to the six storage containers whereby pressing of one of the six buttons will slide a corresponding storage container beneath the opening in the top wall of the hollow rectangular container, the control mechanism having an activation button and a deactivation button.

4. A home recycling center for crushing glass, flattening metals and plastic to be deposited into storage containers comprising, in combination:

a hollow rectangular compartment having an opening formed through a top wall thereof, a vertical compartment secured to the top wall about the opening formed therethrough, the rectangular compartment having a plurality of longitudinal tracks secured therein, each of the tracks secured to a front wall with a corresponding track secured to a rear wall;

a crushing mechanism secured within the vertical compartment of the hollow rectangular compartment;

a plurality of storage containers having wheels adapted for slidable coupling with the plurality of longitudinal tracks of the hollow rectangular compartment.

5. The center as described in claim 4 wherein each of the plurality of storage containers having a handle portion extending outwardly of slots formed in the front wall of the hollow rectangular container whereby grasping the handle portion allows for the storage containers to slide back and forth along the plurality of longitudinal tracks.

6. The center as described in claim 4 wherein the crushing mechanism comprising a plurality of rotating gears arranged in a vertical fashion, the plurality of gears having a wide upper end adjacent to an open top of the vertical compartment and tapering downwardly towards a narrow lower end immediately above the opening formed through the top wall of the hollow rectangular compartment, the crushing mechanism further comprising a drive pulley coupled with the plurality of rotating gears whereby activation of the drive pulley will rotate the plurality of gears.

7. The center as described in claim 4 wherein each of the storage containers having a motor secured to an underside thereof, each motor having a drive gear extending outwardly therefrom to engage a lower edge of the plurality of longitudinal tracks on the front wall of the hollow rectangular compartment whereby activation of each motor will slide the plurality of storage containers back and forth along the plurality of longitudinal tracks.

8. The center as described in claim 7 and further including a control mechanism secured to an upper portion of the hollow rectangular compartment, the control mechanism having means to control the slidability of the plurality of sliding bins.

9. The center as described in claim 4 and further including a twine dispenser secured to an upper portion of the hollow rectangular compartment, the twine dispenser having twine removably secured therein.

* * * * *